United States Patent
Dyck et al.

(10) Patent No.: US 7,357,744 B2
(45) Date of Patent: Apr. 15, 2008

(54) HYDRO-MECHANICAL CONTINUOUSLY VARIABLE TRANSMISSION

(76) Inventors: Gerald Dyck, 37667 Dawson Road, Abbotsford, British Columbia (CA) V3G 2K9; Paul Dries, 2734 Mara Drive, Coquitlam, British Columbia (CA) V3C 5R9

( * ) Notice: Subject to any disclaimer, the term of this patent is extended or adjusted under 35 U.S.C. 154(b) by 254 days.

(21) Appl. No.: 10/496,590

(22) PCT Filed: Nov. 19, 2002

(86) PCT No.: PCT/CA02/01789

§ 371 (c)(1),
(2), (4) Date: Nov. 10, 2004

(87) PCT Pub. No.: WO03/046415

PCT Pub. Date: Jun. 5, 2003

(65) Prior Publication Data

US 2005/0054469 A1    Mar. 10, 2005

(30) Foreign Application Priority Data

Nov. 22, 2001    (CA) .................................... 2363653

(51) Int. Cl.
*B62D 11/06* (2006.01)
(52) U.S. Cl. ............... 475/24; 475/21; 475/27; 475/28
(58) Field of Classification Search ............ 475/21, 475/22, 23, 24, 27, 28
See application file for complete search history.

(56) References Cited

U.S. PATENT DOCUMENTS

| | | | |
|---|---|---|---|
| 3,426,621 A | * | 2/1969 | Mooney, Jr. et al. ......... 475/24 |
| 3,446,093 A | | 5/1969 | Orshansky |
| 3,492,891 A | | 2/1970 | Livezey |
| 3,534,635 A | * | 10/1970 | Polak ........................... 475/24 |
| 3,575,006 A | * | 4/1971 | Rugroden et al. .......... 405/182 |
| 3,897,697 A | * | 8/1975 | Chambers et al. ............ 475/80 |
| 3,982,448 A | * | 9/1976 | Polak et al. .................. 475/80 |
| 4,122,732 A | | 10/1978 | Chana |
| 4,569,251 A | * | 2/1986 | Greenwood ................... 475/26 |
| 5,026,333 A | * | 6/1991 | Meyerle ........................ 475/23 |
| 5,967,927 A | | 10/1999 | Imamura et al. |
| 6,413,189 B1 | * | 7/2002 | Spiess et al. ................ 477/110 |
| 6,904,997 B2 | | 6/2005 | Pollman |

FOREIGN PATENT DOCUMENTS

DE        11 58 380        11/1963

(Continued)

OTHER PUBLICATIONS

ASAE Lecture, Tractor Design No. 29, Feb. 2005 Continuously Variable Tractor Transmissions Karl Renius and Rainer Resch Presented at the 2005 Agricultural Equipment Technology Conference Louisville, KY, USA Feb. 14-16, 2005.

*Primary Examiner*—David D. Le
(74) *Attorney, Agent, or Firm*—Vermette & Co.; Clifford W. Vermette (57) ABSTRACT

The invention comprises a hydro-mechanical continuously variable transmission (HMCVT) that uses a planetary gear system to provide a combination of hydraulic and mechanical power for a vehicle or stationary equipment. The invention further comprises various ancillary elements to improve the performance of the HMCVT.

15 Claims, 9 Drawing Sheets

FOREIGN PATENT DOCUMENTS

| | | |
|---|---|---|
| DE | 2335629 | 1/1975 |
| EP | 0450282 | 10/1991 |
| FR | 2.217.603 | 2/1974 |
| JP | 59187140 A * | 10/1984 |
| JP | 60227045 A * | 11/1985 |
| JP | 02066361 A * | 3/1990 |
| WO | WO 99/24738 | 5/1999 |

* cited by examiner

HYDRO-MECHANICAL CONTINUOUSLY VARIABLE TRANSMISSION

FIELD

This invention relates to a drive system useful as a vehicle propulsion system or stationary equipment drive, combining mechanical and hydraulic power systems.

BACKGROUND

Hydraulic drive systems are commonly used for large vehicles or stationary equipment. However, as the output speed increases at a given gear setting, the efficiency of the hydraulic drive is correspondingly reduced. This makes it inefficient to run hydraulic drives at the upper half of the gear setting. This problem may be overcome by having multiple gear settings, but the complexity of the resulting transmission negates the benefits of using a hydraulic drive.

An alternative to a hydraulic drive system is a mechanically driven system. However, conventional mechanical drive systems are limited to discrete gear ratios, which do not allow for infinite speed ratios as found in hydraulic drives. A great deal of power management between the engine and the transmission at all output speeds is necessary for transmission effectiveness. A purely mechanical drive is inadequate to ensure the efficient use of the engine's available power due to the discrete speed ratios, while a purely hydraulic drive has inherently poor efficiency at higher operational speeds.

With the increasing costs of fuel and more stringent emissions requirements, there is a need for more efficient drive systems for large and small vehicles, as well as stationary equipment, to replace traditional hydraulic and mechanical drive systems.

It is an object of this invention to provide a more efficient drive system for large and small vehicles and stationary equipment by combining hydraulic and mechanical power systems.

It is a further object of this invention to provide a transmission system for optimizing use of combined drive systems.

It is a still further object of this invention to provide a combined drive system with a dual or multiple speed, shift-on-the-fly gearbox for extended speed and torque ranges.

It is a still further object of this invention to provide an improved steering system for combined drive systems when applied to differential output speed requirements.

SUMMARY

The invention comprises a hydro-mechanical continuously variable transmission (HMCVT) that uses a planetary gear system to provide a combination of hydraulic and mechanical power for a vehicle or stationary equipment.

The HMCVT may also include a 2-speed planetary clutch system to expand the operating parameters of the vehicle or stationary equipment.

The HMCVT may further include a planetary steering system that works with or without the 2-speed planetary clutch system.

The HMCVT may also include a launch assist device to limit torque applied to the drive pump when the ratio of hydraulic pump displacement to hydraulic motor displacement is small.

The HMCVT may additionally include a lockup brake coupled to the hydraulic branch input, operative to lock out the hydraulic branch and force all power through the mechanical branch when the transmission output is operating at a pre-selected percentage of its maximum speed. The lockup brake may be combined with the launch assist device into a single device.

The HMCVT may further include an anti-recirculating reverser device operative to allow the transmission output to operate in a reverse direction of motion without developing a recirculating power flow through the mechanical branch.

The 2-speed planetary clutch, planetary steering system, launch assist device, lockup brake and anti-recirculating reverser device may be used individually or in any combination of two or more in any given HMCVT.

BRIEF DESCRIPTION OF THE DRAWINGS

The invention itself, both as to organization and method of operation, as well as additional objects and advantages thereof, will become readily apparent from the following detailed description when read in connection with the accompanying drawings.

DETAILED DESCRIPTION

The hydro-mechanical continuously variable transmission (HMCVT) is designed to split input power between a hydraulic drive branch, using a hydraulic pump and motor, and a parallel mechanical drive branch, using shafts and/or gears, recombining the power from each branch into a single output.

Figure 1:
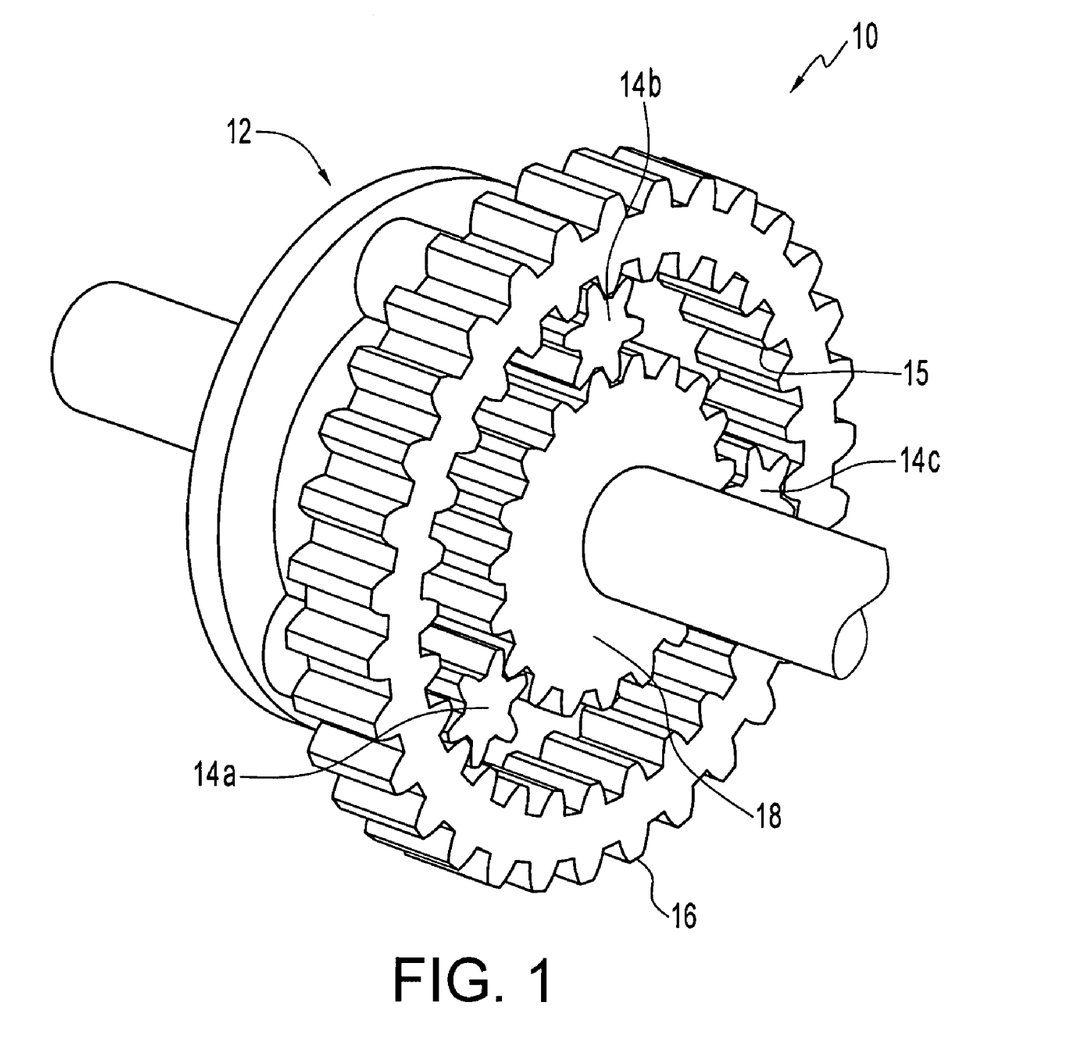
FIG. 1 shows a planetary gear set with multiple planetary gears.

The HMCVT is based on a planetary gear set 10 as shown in FIG. 1. A planetary gear set 10 consists of four parts: a carrier 12, a number of planetary gears 14, an internal ring gear 15, and a sun gear 18. The ring gear 15 and the sun gear 18 are connected through the planetary gears 14. The planetary gears 14 are also connected to the carrier 12. In FIG. 1, three planetary gears 14a-c are used, more may be used if necessary. Transfer gear 16 is not properly considered a part of the planetary gear set, but may be optionally included as one way of conveying torque from the planetary gear set, as described below.

Figure 2:
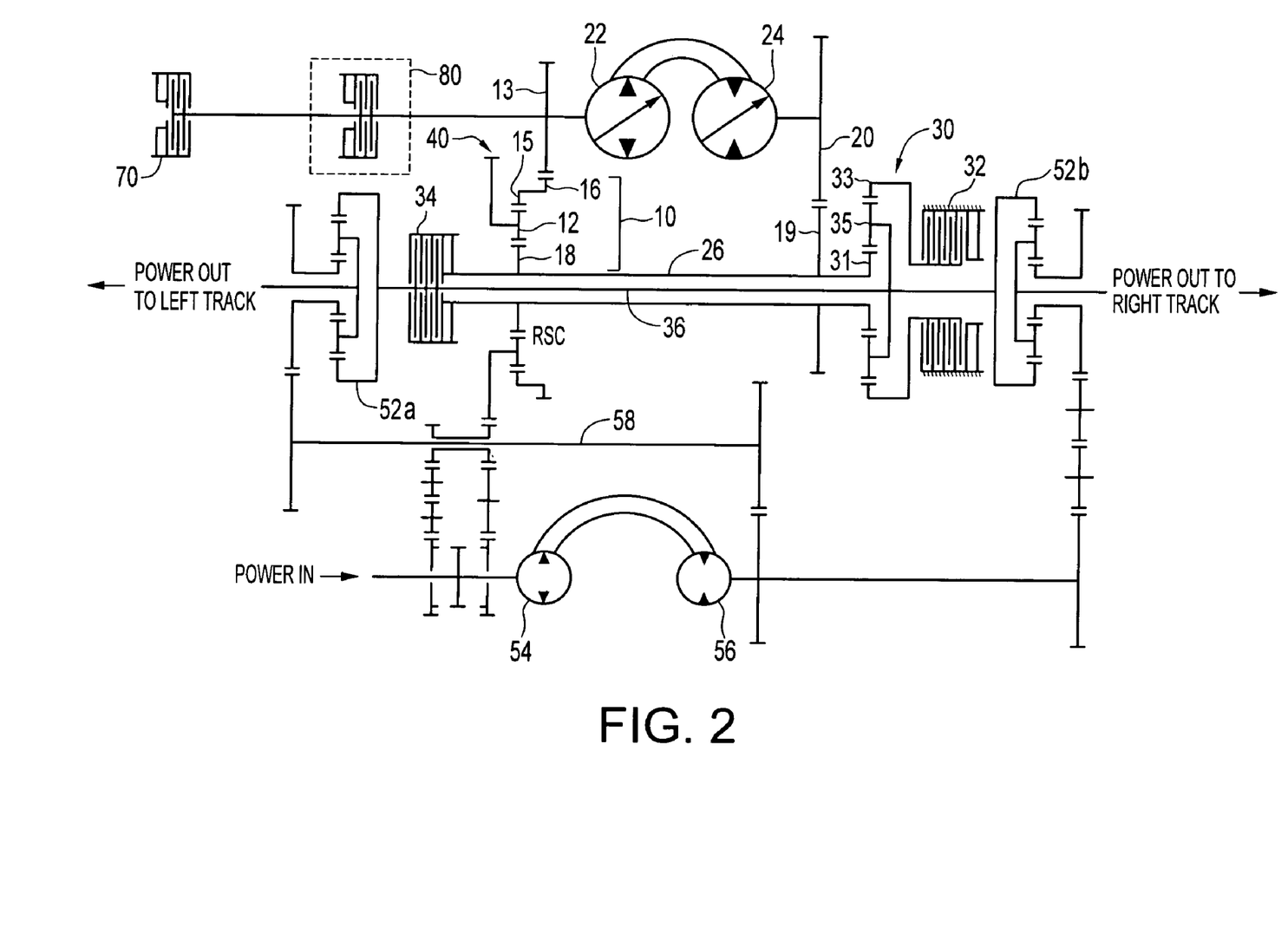
FIG. 2 shows a block diagram of an HMCVT in a RSC configuration with all optional components.

The planetary gear set 10 is connected to the hydraulic drive pump 22 through transfer gear 13 and transfer gear 16, (see FIG. 2). The planetary gear set is also connected to the main shaft 26 and the transmission input 40. A 3 letter code (R=ring gear; S=sun gear; C=carrier) has been adopted for purposes of this discussion to describe how the planetary gear set 10 is connected within the transmission: $1^{st}$ letter designates which part of planetary gear set 10 is connected to the hydraulic drive pump 22; $2^{nd}$ letter designates which part of planetary gear set 10 is connected to the main shaft 26; the last letter designates which part of planetary gear set 10 is connected to the input 40 from the engine.

A full HMCVT system in a RSC configuration with all optional components connected is shown in FIG. 2. In the RSC configuration, input power is transferred to a variable hydraulic drive pump 22 by means of transfer gears 16 and 13. Sun gear 18 is connected to the combiner, i.e. transfer gear, gear 20 via the main shaft 26 and transfer gear 19. The combiner gear 20 is also connected to a variable hydraulic drive motor 24. The input 40 from the main engine (not shown) to the HMCVT is received by the carrier 12.

Additional elements of the invention, discussed below and shown in FIG. 2, include lock up brake 80, 2-speed output shaft 36, launch assist device 70, high-speed clutch 34, low speed clutch 32, a 2-speed shifting planetary gear set 30, two steering planetary gear sets 52a, 52b, a steering system pump 54, a steering system motor 56, and a zero shaft 58.

Figure 3:
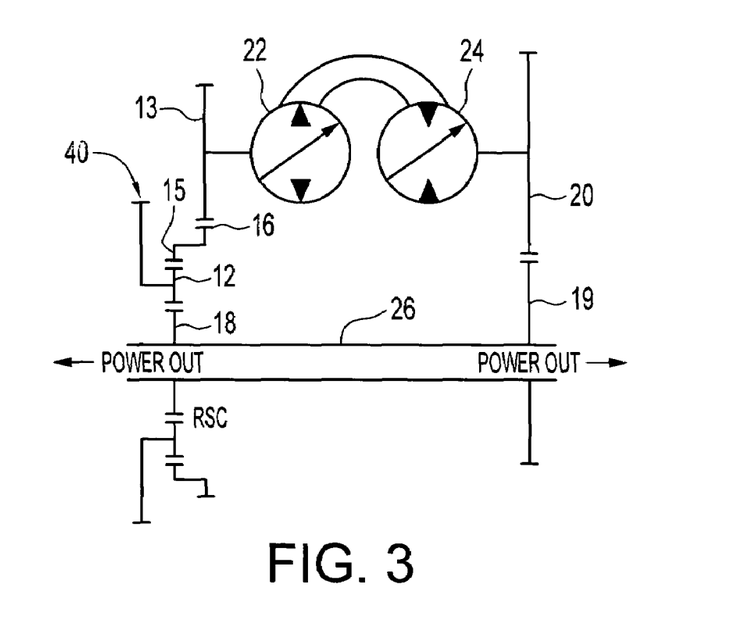
FIG. 3 shows a block diagram of an HMCVT in a RSC configuration.
Figure 4:
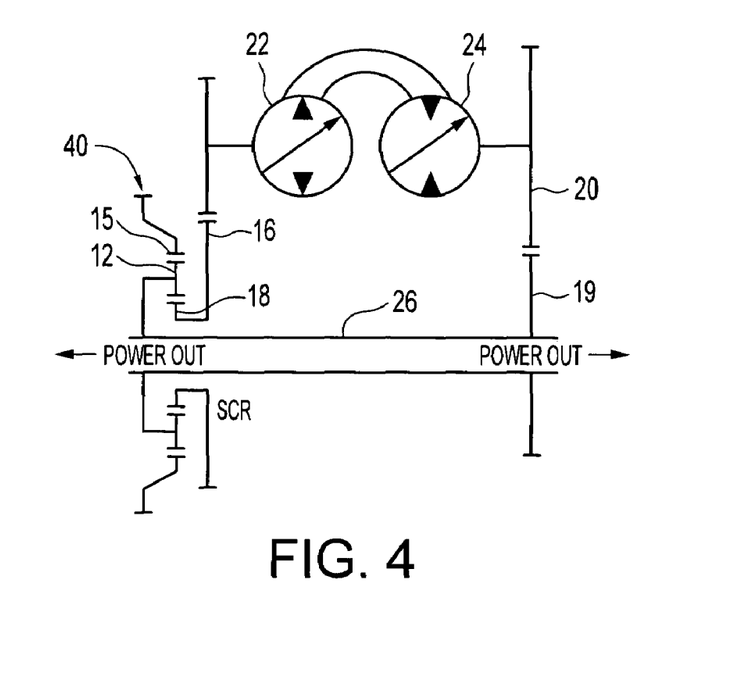
FIG. 4 shows a block diagram of an HMCVT in a SCR configuration.

As can be seen in the detailed drawing of the RSC embodiment, FIG. 3, only four transfer gears 13, 20, 16, and 19 are required to transfer power from the input, through the hydraulic and mechanical branches, and to the main output; i.e. two transfer gears, 13 and 16 transfer input to the hydraulic branch, and two transfer gears, 19 and 20 combine the output from the hydraulic and mechanical branches to the main output A HMCVT system in a SCR configuration is shown in FIG. 4. In the SCR configuration, a hydraulic drive pump 22 is connected to the sun gear 18 of the planetary gear set 10 and the carrier 12 is connected to the combiner gear 20 via the main shaft 26 and transfer gear 19. The combiner gear 20 is also connected to a hydraulic drive motor 24. The input 40 to the HMCVT is received by ring gear 15.

Figure 5:
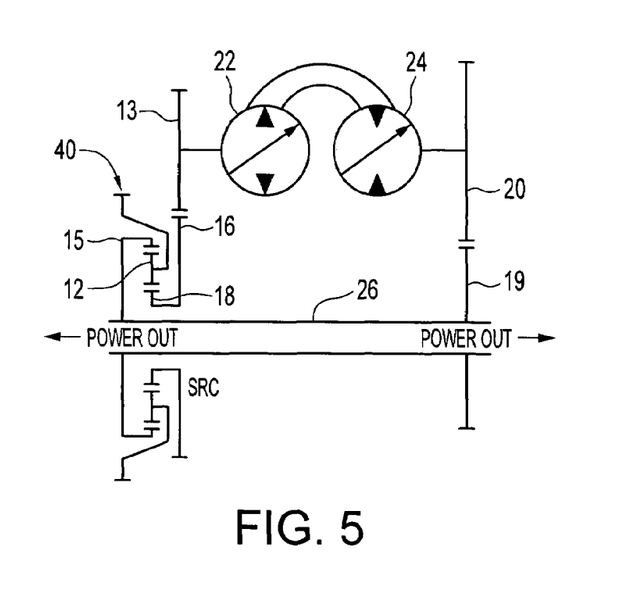
FIG. 5 shows a block diagram of an HMCVT in a SRC configuration.

A HMCVT system in a SRC configuration is shown in FIG. 5. In the SRC configuration, a hydraulic drive pump 22 is connected to the sun gear 18 of the planetary gear set 10. Ring gear 15 is connected to the combiner gear 20 via the main shaft 26 and transfer gear 19. The combiner gear 20 is also connected to a hydraulic drive motor 24. The input 40 to the HMCVT is received by the carrier 12.

In theory, the carrier 12, ring gear 15 or sun gear 18 may be connected to the input 40, drive pump 22 and main shaft 26 in any combination. However, the above three configurations have tested as the most practical for application as transmissions for large vehicles.

Mathematically, it can be shown that in the HMCVT disclosed herein, the power is split such that the power from the hydraulic system (including the drive pump 22 and the drive motor 24) combines with the mechanical system (including the main shaft 26) to equal 100% of the total power less efficiency losses. It can further be shown that the percentage of mechanical power increases as the output speed increases, with a corresponding decrease in hydraulic power. The result is a more efficient use of the input energy than in a strictly hydraulic or strictly mechanical transmission.

It can also be shown that the torque ratio between the ring gear 15 and the sun gear 18 is only dependent on the gear ratio between the ring gear 15 and the sun gear 18. This means that the final gear ratio of the HMCVT can be set by the choice of ring gear 15 and sun gear 18.

In order to establish this point mathematically, first define the following terms: h-hydraulic, m-mechanical, i-input, specific speed ($O_x$) is ratio of x (x=h,m,i) gear speed to input (i) gear speed.

Define a constant. R as the speed of the m-gear when the h-gear is not turning: $R=O_m|O_h=0$. Then define $O_m=RS$, where S reflects the actual speed of the output (as a value from 0 to 1). R and S are used to make the equations independent of the actual configuration of the planetary gear set 10.

Since $O_m$ is linear in S, $O_h$ must also be linear with S, as a function of (1−S), since $O_h=0$ when S=1. At S=1/R, $O_m=1$. This means that at S=1/R the i-gear and m-gear are turning at the same speed. Considering the planetary gear model in FIG. 1, this means that ring gear 15 and sun gear 18 are turning at the same speed. For this to occur, the planetary gears 14 must not be turning, meaning that the carrier 12 is also turning at the same speed as ring gear 15 and sun gear 18.

More generally, when any two of the gears of the planetary gear set 10 are moving at the same speed, so is the third gear. Using this result, we then get $O_h=(R/R-1)(1-S)$.

The power split then becomes $P_h=1-S$ and $P_m=S$. This also means that two forms of power recirculation can occur: "overdrive" when S>1 and "reverse" when S<0.

In the physical HMCVT, the combiner gear 20 (FIG. 2) and planetary gear set 10 are responsible for controlling the distribution of power between the hydraulic and mechanical systems. As the output speed changes, the power split between the hydraulic and mechanical systems is changed as described above. When the output is motionless (speed=0), main shaft 26 is also motionless (0 rpm). As the output moves, the drive pump 22 must pump fluid and, initially, all the power is derived from the drive pump 22 and drive motor 24. As the output speed increases, the main shaft 26 and the connected drive motor 24 (through the combiner gear 20) must turn faster. As a result, the drive pump gear (in the RSC configuration, ring gear 15 turns slower, due to the effect of the planetary gear system 10 and the need to maintain a constant torque ratio.

A considerable advantage of the HMCVT lies in the unique ability of the configured systems as shown in FIGS. 2-5 to enable a driven output on both ends of the transmission via a common shaft 26. This is particularly useful in vehicles or stationary equipment that require duplicated output shafts to two drives such as tracks and/or differentials.

Furthermore, one or both of the outputs can be engaged or disengaged eliminating the need for a transfer case when configured for multiple output drives.

The HMCVT speed can be controlled in any conventional manner, however an electronic control system is preferred to best optimize the power splitting in connection with the output speed. Furthermore, the electronic control system can also include control means for the two-speed transmission system, planetary steering system, launch assist device, lockup brake and anti-recirculatory reverser discussed below.

Two-Speed Transmission

Figure 6:
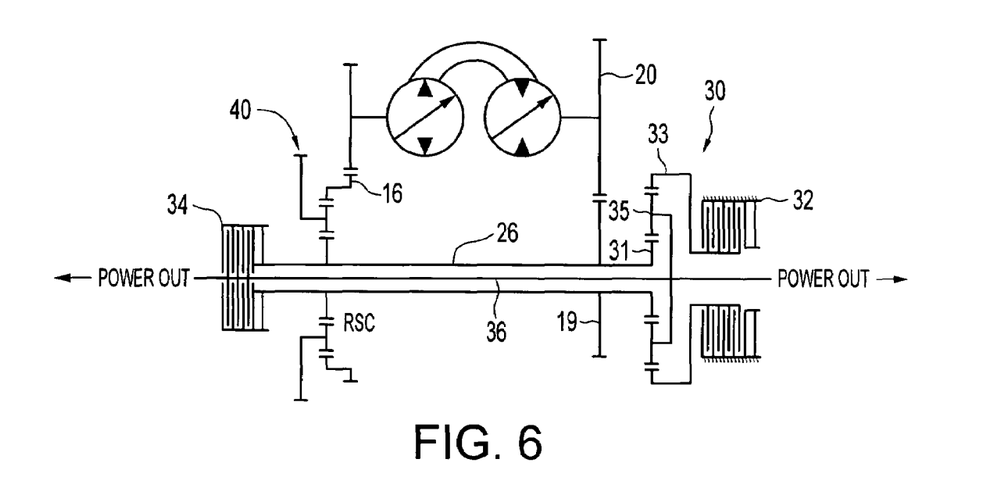
FIG. 6 shows a block diagram of an HMCVT in a RSC configuration with a 2-speed clutch.

An additional modification to optimize the use of the HMCVT is a two-speed planetary clutch system as shown in FIG. 6. The main shaft 26 is connected to the input of an additional 2-speed shifting planetary 30. Power enters the shifting planetary through the shifting planetary sun gear 31 and exits through the shifting planetary carrier 35 and 2-speed output shaft 36. In low speed operation, the shifting planetary ring gear 33 is held fixed by a low-speed clutch or brake 32, creating a reduction in the gear ratio. Shifting to high gear for high-speed operation is accomplished by releasing the brake 32 and applying a high-speed clutch 34 to effectively give a 1:1 gear ratio.

The 2-speed planetary clutch system provides an extended range of available speeds and torques to the operator. The result is an increased operating envelope for the vehicle or stationary equipment.

Planetary Steering System

Figure 7:
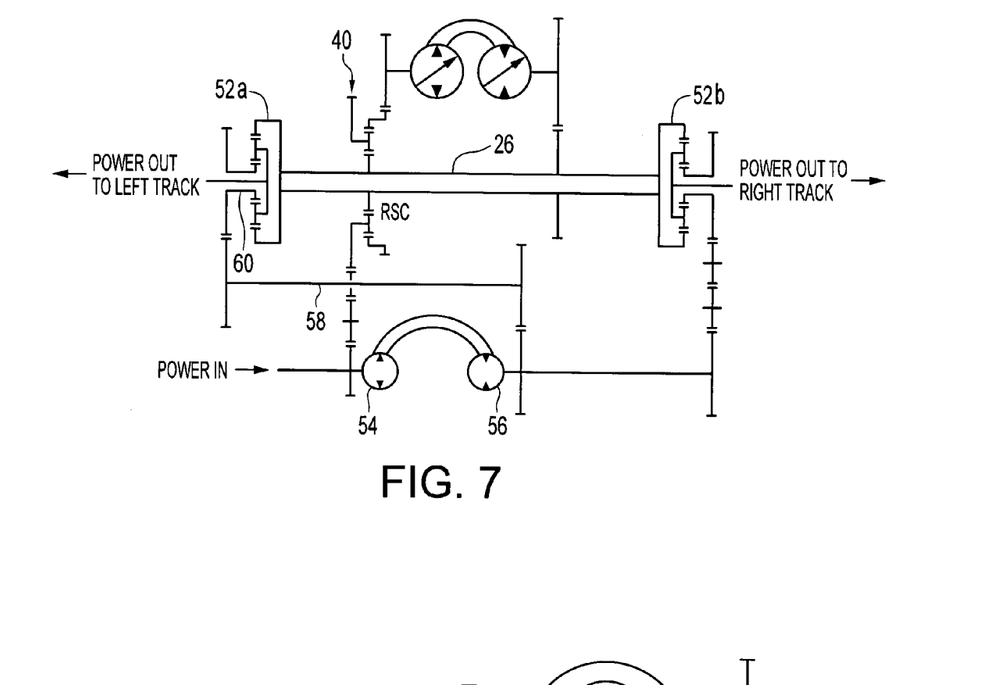
FIG. 7 shows a block diagram of an HMCVT in a RSC configuration with a planetary steering system.

Another useful modification for the HMCVT is a planetary steering system as shown in FIGS. 2 and 7. As shown, power is sent from the main input 40 to two steering planetary gear sets 52a and 52b, one for each output drive on either side of the transmission. If a two speed is also to be incorporated as shown in FIG. 2, power is sent from the 2-speed output shaft to steering planetary gear sets 52a and 52b. The steering system also includes a closed-loop hydraulic pump 54 that is driven in relation to the current engine RPM. The output of the pump 54 is connected to a hydraulic motor 56 that drives a cross shaft assembly referred to as a zero shaft 58.

The zero shaft 58 is connected to the sun gear 60 of the left and right steering planetary gear sets 52a and 52b, and the left and right sun gears 60 are driven by the motor 56 in opposite directions. Therefore, when the zero shaft 58 turns, the speed of the inside drive of the vehicle decreases and the speed of the outside drive increases.

The result of the planetary steering system is a high-precision steering system that provides quick reaction times while maintaining good driving characteristics during straight-ahead motion.

Launch Assist Device (LAD)

One characteristic of the HMCVT is that at low output speeds, the pump 22 is set to a very low displacement and the motor 24 is set to a high displacement. In theory, this could create a very large torque multiplication through the hydraulic branch of the HMCVT. However, in that scenario, the hydraulic pressures generated would exceed those that can be withstood by the system. Therefore, the hydraulic ratio must be reduced to limit pressure to acceptable levels. Unfortunately, this corrective measure also reduces the output torque at very low speeds.

Figure 8:
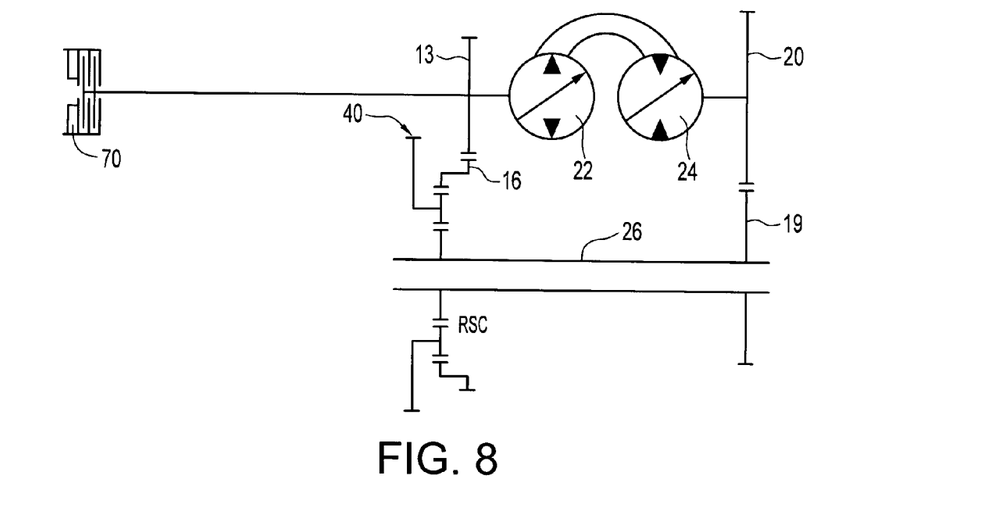
FIG. 8 shows a block diagram of an HMCVT in a RSC configuration with a launch assist device.

To solve this problem, an energy absorber, called a Launch Assist Device (LAD) 70 is attached to the pump 22 as shown in FIG. 8. The LAD 70 provides an initial resistance to the gear element of the planetary 10 driving the hydraulic branch. This resistance limits the torque available to the pump 22 and allows the mechanical branch to reach its full torque output at very low speeds. As a result, the torque is available at the output of the HMCVT.

The LAD 70 is only required at very low speeds and should be gradually phased out as the speed increases. As shown, the LAD 70 is a modulated brake assembly. However, other devices, including hydrodynamic devices such as a fluid coupling or a torque converter, could be used.

Lockup Brake

At the upper limit of the HMCVT operating range, the displacement ratio between the motor 24 and the pump 22 decreases to the point where the amount of torque available to the pump 22 is insufficient to keep it turning. With the speed of the hydraulic pump 22 at zero, all the power is transferred exclusively through the mechanical branch. Unfortunately, most currently available pump and motor designs include some degree of internal leakage, preventing the HMCVT from reaching a pure 100% mechanical state.

Figure 9:
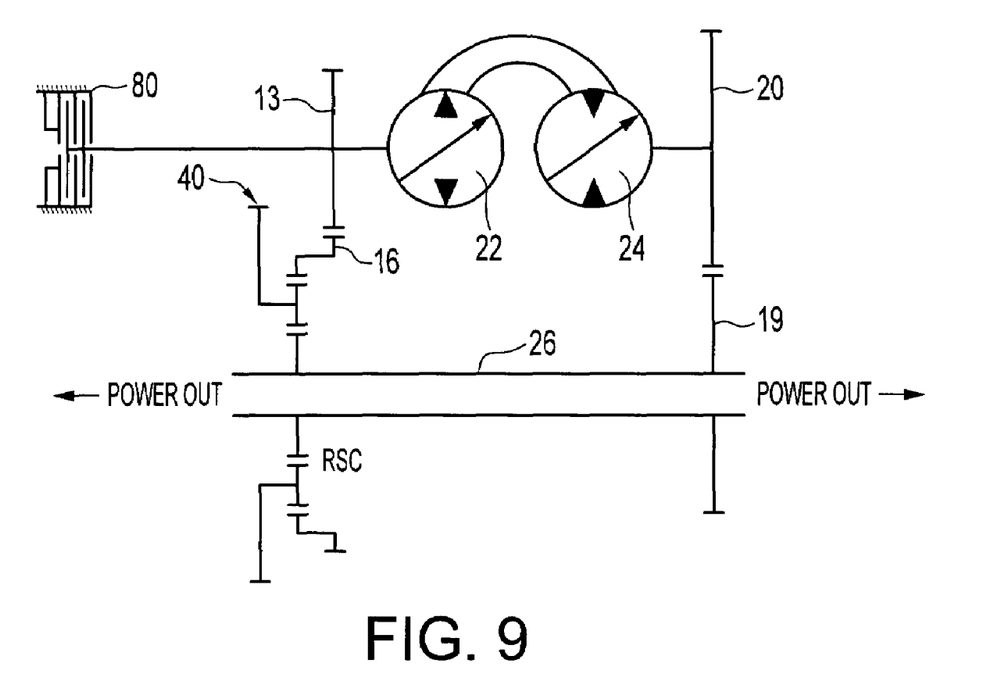
FIG. 9 shows a block diagram of an HMCVT in a RSC configuration with a lockup brake.

This problem can be solved by using a lockup brake 80 as shown in FIG. 9 to prevent the pump 22 from turning at the end of the operating range. The lockup brake 80 is attached to one of the gears 10 driving the pump 22. When the upper end of the operating range is reached, the lockup brake 80 is activated, forcing the HMCVT into a pure 100% mechanical mode. The lockup brake 80 can then be deactivated when the HMCVT operating range falls out of the upper regions. The activation/deactivation point for the lockup brake 80 will be determined by the operating conditions and parameters for the vehicle or stationary equipment using the HMCVT.

Anti-Recirculatory Reverser

The simplest way to reverse the direction of the final output of the transmission is to reverse the drive motor. When this happens, the power in the mechanical branch is negative and the power in the hydraulic branch is greater than the input power. What is effectively happening is that the drive motor must reverse the direction of the mechanical output of the split speed, feeding power upstream through the mechanical branch. To balance out the power equations, the hydraulic branch must transfer an amount of power equal to the input plus the recirculated power from the mechanical branch.

In order to accommodate the increased power levels, both the hydraulic and the mechanical branches must have increased component strength and/or size, which is not always practical or desirable. Therefore, an additional reverser subsystem that avoids the need to reinforce the hydraulic is desirable.

Figure 10:
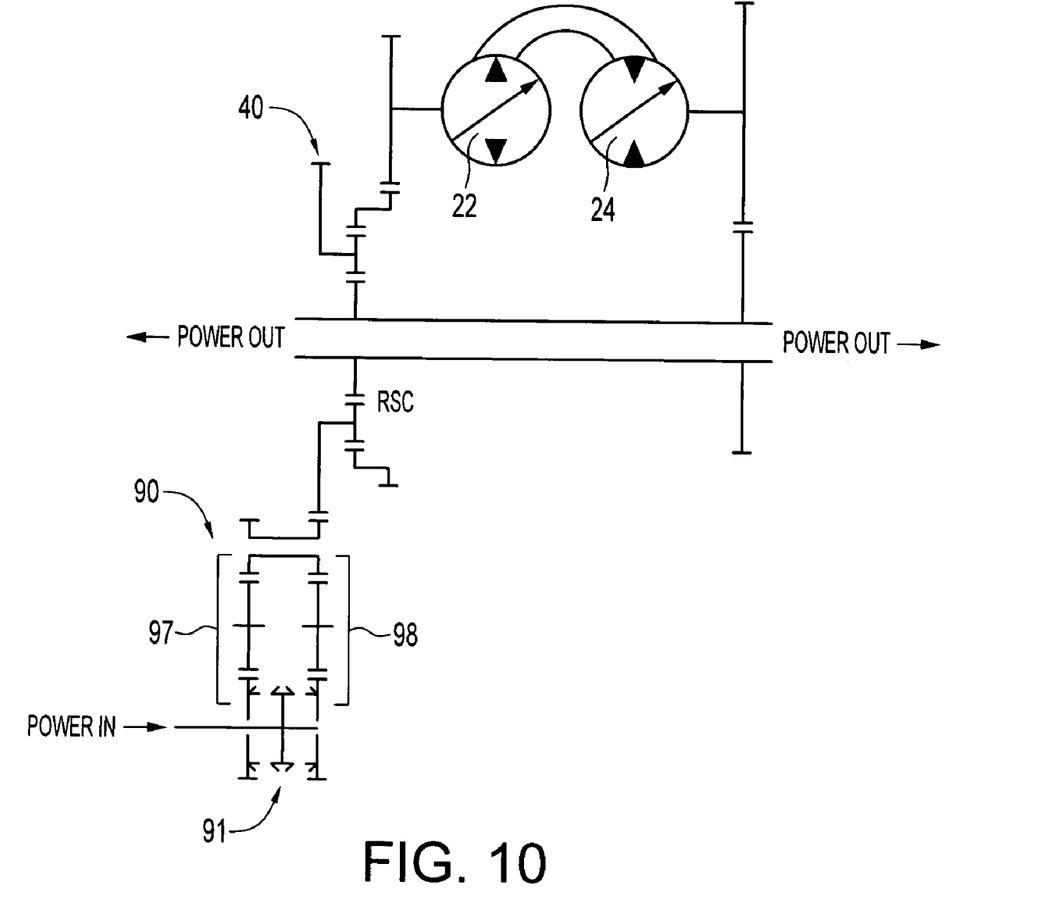
FIG. 10 shows a block diagram of an HMCVT in a RSC configuration with a spur gear reverser.
Figure 11:
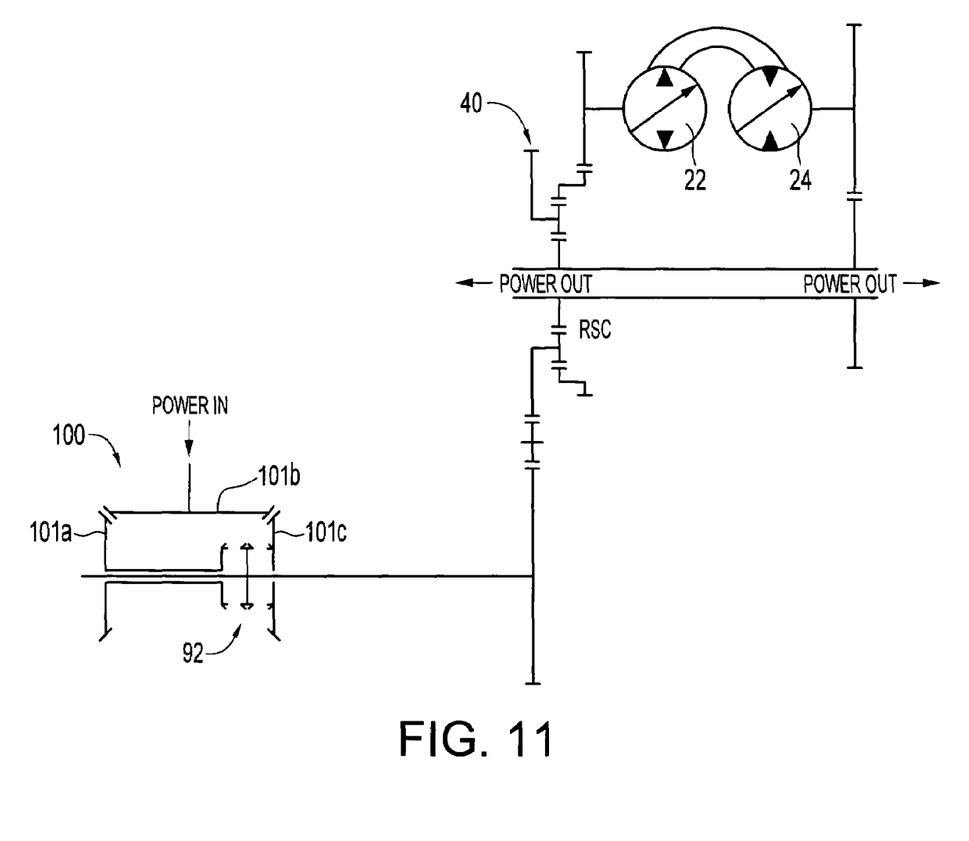
FIG. 11 shows a block diagram of an HMCVT in a RSC configuration with a bevel gear reverser.

Two potential reverser subsystems 90, 100 as shown in FIGS. 10 and 11 respectively involve the installation of a reversible gear at the input. In FIG. 10 input 40 is connected through one of the two gear sets 97, 98 to a sliding clutch/synchronizer assembly 91. Depending on which gear set is engaged with the clutch/synchronizer 91 the HMCVT components, including the drive pump 22 and motor 24, will rotate in either the forward or reverse direction. Either spur gears 97, 98 (FIG. 10) or bevel gears 101a, 101b, 101c (FIG. 11) can be used in clutch/synchronizers 91,92; however, bevel gears allow for a 90-degree change between the engine power output and the main axes of the transmission (the final power output). In either case, if steering planetary gear sets 52a and 52b (see FIG. 7) are present, they are connected to the power output through a preset gear ratio and a constant direction so that the steering will function regardless of the forward/reverse direction of clutch/synchronizers 100 and 90.

Figure 12:
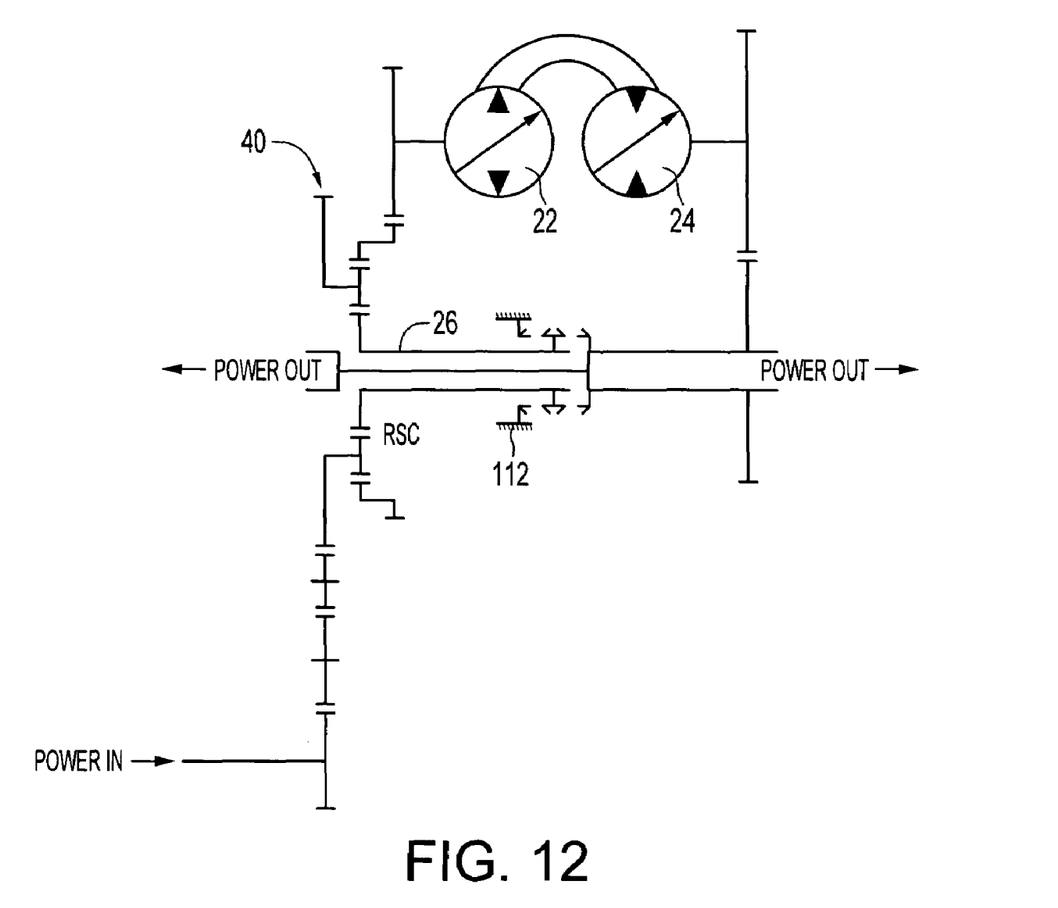
FIG. 12 shows a block diagram of an HMCVT in a RSC configuration with a mechanical disconnect reverser.

An alternative subsystem for the reverser shown in FIG. 12 disconnects the mechanical branch during reverse hydraulic operation and locks the mechanical output to the transmission housing (not shown). In this case, the input shaft always rotates in the same direction. The mechanical output may be selectively coupled to either the main shaft 26 or the transmission housing by means of a clutch/synchronizer assembly 112. When the mechanical output is connected to the main shaft 26, forward output speeds result. When the mechanical output is connected to the housing, the mechanical branch is locked out of the transmission. Reverse output speeds can then be achieved by reversing the direction of the drive motor. Power flows exclusively through the hydraulic branch and cannot be recirculated back through the mechanical branch.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

The invention claimed is:

1. A hydro-mechanical, continuously variable transmission (HMCVT) for a vehicle or stationary equipment, said HMCVT comprising:
   a) an input planetary gear set comprising a first ring gear, a first sun gear, and a first carrier;
   b) a power input means coupled to a first one of said first ring gear, said first sun gear, and said first carrier;
   c) a main power output means comprising a main shaft;
   d) a first transfer gear;
   e) a second transfer gear, wherein said first and said second transfer gears are coupled to said input planetary gear set;
   f) a third transfer gear;
   g) a fourth transfer gear couplable to said main power output means;
   h) a hydraulic drive branch comprising a first hydraulic pump, a first hydraulic motor, and a hydraulic drive output, wherein
      i) said first hydraulic pump is of the variable displacement type;
      ii) said first hydraulic motor is of the variable displacement type;
      iii) said first hydraulic pump and said first hydraulic motor are coupled to one another in a closed-loop circuit;
      iv) said first hydraulic pump is coupled through said first and said second transfer gears to a second one of said first ring gear, said first sun gear, and said first carrier for receiving power input to said hydraulic drive branch;
      v) said hydraulic drive output comprises said first hydraulic motor coupled to said third transfer gear; and,
      vi) said hydraulic branch is operable to produce a variable input/output torque ratio by varying the displacements of said hydraulic pump and said hydraulic motor causing said input and output means to rotate at selected relative speeds;
   j) a mechanical drive branch having a fixed gear ratio, a fixed input/output torque ratio, and a mechanical drive output, wherein said mechanical drive branch is operable to receive power input from a third one of said first ring gear, said first sun gear, and said first carrier, and wherein said mechanical drive output is operable to transmit output to said main output means;
   k) a two-speed planetary clutch system comprising:
      i) an input coupled to said main shaft;
      ii) a low gear range to increase torque at low output speeds;
      iii) a high gear range to allow for a higher maximum output speed;
      iv) a low speed clutch; and,
      v) a high speed clutch, wherein said low speed clutch and said high speed clutch are operable for shifting between the low gear range and the high gear range, respectively; and,
   l) a transmission housing,
wherein said third transfer gear and said fourth transfer gear are operable to combine output from said hydraulic branch with output from said mechanical branch thereby transmitting a main power output to said main output means such that the percentage of mechanical power increases as the output speed increases with corresponding decrease in hydraulic power.

2. An HMCV according to claim 1 wherein said high gear range of said two speed planetary clutch system comprises a 1:1 ratio gear.

3. An HMCVT according to claim 1 further comprising an anti-recirculating reverser device operable to allow said main output means to operate in a reverse direction without developing a recirculating power flow through said mechanical branch.

4. An HMCVT according to claim 3 wherein said anti-recirculating reverser device comprises a clutch/synchronizer operable to selectively couple said mechanical drive output to either said main shaft or to said housing, wherein coupling said mechanical drive output to said main shaft results in forward operation and coupling said mechanical drive output to said housing results in reverse operation, and wherein reverse operation power flows to said main shaft solely from said hydraulic drive output.

5. An HMCVT according to claim 4 wherein said clutch/synchronizer employs spur gears.

6. An HMCVT according to claim 4 wherein said clutch/synchronizer employs bevel gears.

7. An HMCVR according to claim 1 further comprising a launch assist device (LAD) for limiting torque applied to said first hydraulic pump, said LAD comprising an energy absorption device connected to said hydraulic branch input.

8. An HMCVT according to claim 7 wherein said energy absorption device provides an initial resistance to said second one of said first ring gear, said first sun gear, and said first carrier gear coupled to said first hydraulic pump.

9. An HMCVT according to claim 7, wherein said energy absorption device is a brake assembly.

10. An HMCVR according to claim 7, wherein said energy absorption device is a hydrodynamic device.

11. An HMCVT according to claim 1 further comprising a lockup brake coupled to said hydraulic branch input, said lockup brake operable to reversibly lock out said hydraulic branch and force all power through said mechanical branch.

12. An HMCVT according to claim 11, further comprising a launch assist device (LAD) for limiting torque applied to said first hydraulic pump, said LAD comprising an energy absorption device connected to said hydraulic branch input.

13. An HMCVT according to claim 1, further comprising a planetary steering system.

14. An HMCVT according to claim 13, wherein said planetary steering system comprises:
   a) a second hydraulic pump;
   b) a second hydraulic motor;
   c) a zero shaft assembly comprising an input and two outputs, wherein said input is coupled to said second hydraulic motor, and said two outputs geared to rotate at the same speed in opposite directions; and,
   d) two planetary steering gear sets, each of said steering planetary gear sets having:

i) gear ratios aligned coaxially with said main output means
ii) a first input coupled to one of said zero shaft outputs;
iii) a second input coupled to said main shaft; and,
iv) an output;

wherein said outputs of said two planetary steering gear sets are directed to opposite sides of said vehicle or stationary equipment and wherein said second hydraulic pump and said second hydraulic motor are operable to control the amount of power available for said zero shaft.

15. An HMCVT of claim 14 wherein the gear ratios of said two steering planetary gear sets are identical to each other.

* * * * *